May 2, 1967 W. R. SMITH-VANIZ 3,317,849
HYBRID CIRCUIT FOR RADIO FREQUENCY
SIGNAL PROCESSING APPARATUS
Filed Dec. 17, 1963 5 Sheets-Sheet 1

INVENTOR.
WILLIAM REID SMITH-VANIZ
BY
Blair E. Buckles
ATTORNEYS

May 2, 1967

W. R. SMITH-VANIZ

HYBRID CIRCUIT FOR RADIO FREQUENCY SIGNAL PROCESSING APPARATUS 3,317,849

Filed Dec. 17, 1963

5 Sheets-Sheet 2

INVENTOR.
WILLIAM REID SMITH-VANIZ
BY
Blair E. Buckles
ATTORNEYS

May 2, 1967

W. R. SMITH-VANIZ

HYBRID CIRCUIT FOR RADIO FREQUENCY SIGNAL PROCESSING APPARATUS 3,317,849

Filed Dec. 17, 1963

5 Sheets-Sheet 3

INVENTOR.

WILLIAM REID SMITH-VANIZ

BY

Blair E. Buckles

ATTORNEYS

May 2, 1967

W. R. SMITH-VANIZ

HYBRID CIRCUIT FOR RADIO FREQUENCY SIGNAL PROCESSING APPARATUS 3,317,849

Filed Dec. 17, 1963

5 Sheets-Sheet 4

INVENTOR.
WILLIAM REID SMITH-VANIZ
BY
Blair E. Buckles
ATTORNEYS

INVENTOR.
WILLIAM REID SMITH-VANIZ
BY
Blair E. Buckles
ATTORNEYS

United States Patent Office 3,317,849
Patented May 2, 1967

3,317,849
HYBRID CIRCUIT FOR RADIO FREQUENCY SIGNAL PROCESSING APPARATUS

William Reid Smith-Vaniz, Darien, Conn., assignor to Trak Electronics Company, Inc., Wilton, Conn.
Filed Dec. 17, 1963, Ser. No. 331,138
14 Claims. (Cl. 330—21)

This invention relates to active and passive radio frequency circuits. More particularly, it relates to a novel hybrid circuit and to an amplifying multi-coupler incorporating a network of the hybrid circuits.

The hybrid circuit comprises an arrangement of four transmission line transformers and maintains its operating characteristics, including coupling, isolation, loss, and impedance, over an extremely wide frequency range.

The multi-coupler comprises a cascade network of the hybrid circuits coupling a single input port to a plurality of output ports. It has equal coupling between the input port and each output port and has high isolation between the several output ports. Moreover, it efficiently preserves the broadband characteristics of the hybrid circuits so as to maintain its isolation and uniform coupling over a wide frequency range, extending over four octaves in one embodiment.

The invention also comprehends a wide band radio frequency amplifier suited for use in communication circuits such as the present multi-coupler, where it provides uniform gain for the signal paths between the input port and the various output ports, in addition to enhancing the isolation and coupling performance.

Hybrid circuits of the type described herein can generally be characterized as having two pairs of ports. When matched impedances are connected at the ports, a signal applied to one port of a first pair divides equally between the two ports of the second pair, but no signal appears at the other port of the first pair. The circuit operates in the same manner in reverse, that is, a signal applied to one port of the second pair divides equally between the ports of the first pair and is isolated from the other port of the second pair. Such devices are advantageously used in numerous radio frequency communications systems, where they operate, for example, as diplexers, switches and modulators.

Many hybrid circuits suited for operation at radio frequencies are constructed with selected lengths of transmission line according to their frequency of operation. For example, some depend on the impedance transformations provided by quarter-wavelength transmission lines. These structures are inherently frequency sensitive and hence have limited bandwidths.

It is particularly desirable to have hybrid circuits whose operation is relatively invariant with frequency for use in networks comprising several interconnected hybrid circuits. More specifically, when the impedance of a hybrid circuit in such a network varies with frequency, so that the hybrid circuit presents an impedance mismatch to a second hybrid circuit, the operation of the second such circuit deteriorates markedly. As a result, the performance of the network as a whole varies widely with frequency.

Accordingly, it is an object of the invention to provide an improved hybrid circuit.

Another object of the invention is to provide an improved four-port hybrid circuit for operation at radio frequencies.

A further object of the invention is to provide a hybrid circuit of the above character having substantially uniform operation over a wide range of frequencies. Attaining this object will facilitate the construction of broadband networks of several hybrid circuits.

A more specific object of the invention is to provide a hybrid circuit of the above character whose operation is independent of impedance transformations provided by selected lengths of transmission lines.

The multi-coupler provided by the invention is particularly suited for coupling an antenna to several radio receivers. The receivers can be tuned to different frequencies within the operating band of a broadband antenna to continuously monitor several different communication channels. U.S. Patent No. 3,091,739 discloses a multi-coupler of this type. Optimum performance for such a communication system requires that the signal path from the antenna to each receiver be the same for all frequencies within the operating range. With this performance, the signal that the multi-coupler delivers to each receiver bears the same relationship to the input signal at the antenna.

Accordingly, it is also an object of the present invention to provide a multi-coupling circuit having improved operating characteristics for radio frequency signals.

A more specific object is to provide a multi-coupler having a plurality of output ports and whose coupling to each output port from a single input port is substantially identical and remains uniform over a wide range of frequencies.

It is also an object to provide a broadband multi-coupler of the above character that provides uniform high isolation between the output ports.

Another object of the invention is to provide a multi-coupler of the above character for connection between either balanced or unbalanced transmission lines.

A further object of the invention is to provide an improved high-frequency amplifier having substantially linear operation over a wide range of frequencies. It is also an object that the amplifying circuit provide uniform isolation between its input and output terminals.

Another object of the invention is to provide a wideband amplifying circuit that has uniform input and output impedances over a wide range of frequencies. Such an amplifying circuit is particularly suited for impedance matching operations, in addition to amplification, between radio frequency circuits.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which.

The hybrid circuit of the invention incorporates four transmission line transformers inter-connected to form a circuit having two pairs of ports. Each port is connected symmetrically in the circuit with respect to its paired port so that the circuit isolates paired ports from each other. Moreover, the circuit couples the two ports of each pair equally to each port of the other pair. It also provides a 2:1 impedance transformation between each port and the two other ports coupled thereto.

In a conventional transformer, the inter-winding capacity resonates with the leakage inductances of the windings, thereby detracting from operation at elevated frequencies. On the other hand, a transmission line transformer, as utilized in the hybrid circuits of the present invention, comprises two windings which operate together as a transmission line. The inter-winding or inter-conductor capacitance is a parameter of the characteristic impedance of the line. As a result, the transformer is relatively free of resonances and other frequency effects, and has broadband operation at radio frequencies. Transmission line transformers do, however, introduce a delay to the signals on them. An important feature of the present hybrid circuit is that so long as the delays in the transformer are equal, they do not detract from the operation of the hybrid circuit.

Figure 1:
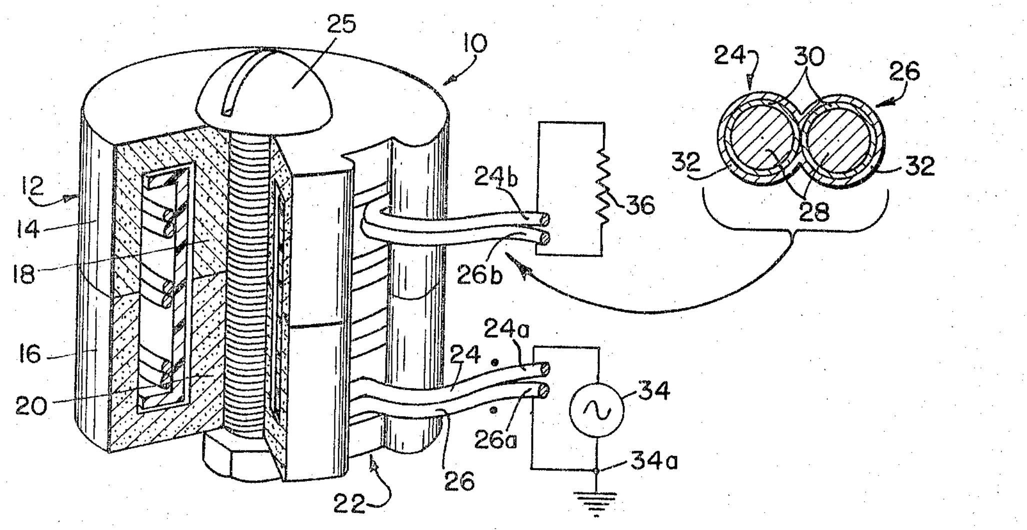
FIG. 1 is a pictorial representation of a transmission line transformer for use in a hybrid circuit embodying the invention.

More specifically, FIG. 1 shows a transmission line transformer, indicated generally at 10, having a core indicated generally at 12. The core 12 is formed of ferrite cups 14 and 16 having central core portions 18 and 20, respectively. The open ends of the cups and their core portions abut when the cups are disposed end-to-end as shown. As a result, the magnetic path between the open rims of the cups and between their core portions is substantially continuous and thus has low reluctance. Each cup has a slot 22 through its exterior wall through which conductors can pass.

A pair of conductors 24 and 26, forming the transformer windings are jointly wound for several turns around the contiguous core portions 18 and 20. The conductors are so wound that currents directed into the adjacent ends of the windings develop fluxes in the same direction. Accordingly, adjacent winding ends are conventionally marked with a dot.

Illustratively, the cups 14 and 16 of the core 12 have a permeability of around 1200. Six turns of the paired conductors 24 and 26 on the core portions 18 and 20 have been found to provide satisfactory operation, with the spacing between adjacent turns preferably being at least three times the diameter of each conductor. The cups appropriately have a central hole extending through the core portions, through which a bolt 25 can pass to clamp the cups together.

The enlarged detail view in FIG. 1 shows a preferred construction for the conductors 24 and 26 wherein each conductor comprises a copper strand 28 over which an insulating jacket 30, suitably of varnish or the like, is formed. A thin layer 32 of thermosetting plastic formed over the insulated conductor strands maintains the two insulating jackets 30 generally in contact. The diameters of the conductor strands 28 and the insulating jackets 30 are selected to provide the desired characteristic impedance of the transmission line comprising the strands.

With the above construction of the transformer 10, each winding has a relatively large self-inductance. Moreover, most of the flux produced by current in one conductor links the other conductor. Hence, the conductors have a relatively large mutual inductance between them. The leakage inductance of each conductor is defined as the difference between the self-inductance and the mutual inductance, and is relatively small.

With these relations, current in the conductor 24 produces magnetic flux linking the turns of the conductor 24 and most of which also links the turns of the other conductor 26. An equal and opposite current in the conductor 26 produces an equal and opposite magnetic flux that links the conductor 26 and most of which links the conductor 24. As a result, the larger portion of the two magnetic fluxes linking the conductors cancel, leaving only the small leakage fluxes linking the conductors.

The impedance of the transmission line that the two conductors 24 and 26 form is defined as the square root of their inductance per unit length divided by the per unit length capacitance between them. As set forth above, with equal and opposite currents in the two conductors, only the leakage fluxes link the conductors and hence their inductance per unit length is small. The conductors are arranged in the transformer 10 with a correspondingly small capacitance between them, "matched" with the leakage inductance, to present a low characteristic impedance, typically 50 or 75 ohms.

With equal and opposite currents, the conductors 24 and 26 thus operate as a transmission line in which the leakage inductance and capacitance between them are matched with each other to provide a resistive characteristic impedance. As in a conventional coaxial or similar transmission line, the characteristic impedance remains uniform over a wide frequency range. The transformer 10 thus provides uniform operation over this wide frequency range, particularly when it interconnects two circuits having impedances equal to the characteristic impedance between the conductors 24 and 26. The transformer is essentially lossless in this matched impedance condition; the only loss being the negligible ohmic loss resulting from the resistance of its conductors 24 and 26.

When the tranformer conductors 24 and 26 do not have equal and opposite currents, the net flux linking each conductor is many times larger than the leakage inductance. As a result, each conductor presents a high inductive reactance to its currents.

During operation, the transformer 10 couples the energy from an unbalanced A.-C. source 34, connected to the conductor ends **24*a* and 26*a*, to a load shown as a resistor 36 connected between the conductor ends 24*b* and 26*b*. The circuit is matched when the internal source impedance is equal to the characteristic impedance of the transmission line formed by the conductors 24 and 26 and is also equal to the impedance of the load resistor 36**.

The transformer windings isolate both conductor ends **24*b* and 26*b* from the grounded source terminal 34*a*, so that either end of the load resistor 36 can be grounded, depending upon the output polarity desired. Alternatively, the transformer 10 can provide a balanced output, achieved by grounding the center of the load resistor. Hence, the transformer 10 transforms the unbalanced input at its ends 24*a* and 26*a*** to a balanced output.

The transformer 10 is bilateral, in that it proves the same performance when the source 34 and load resistor 36 are interchanged. Such a balanced-to-unbalanced transformer is often referred to as a "balun."

Figure 2:
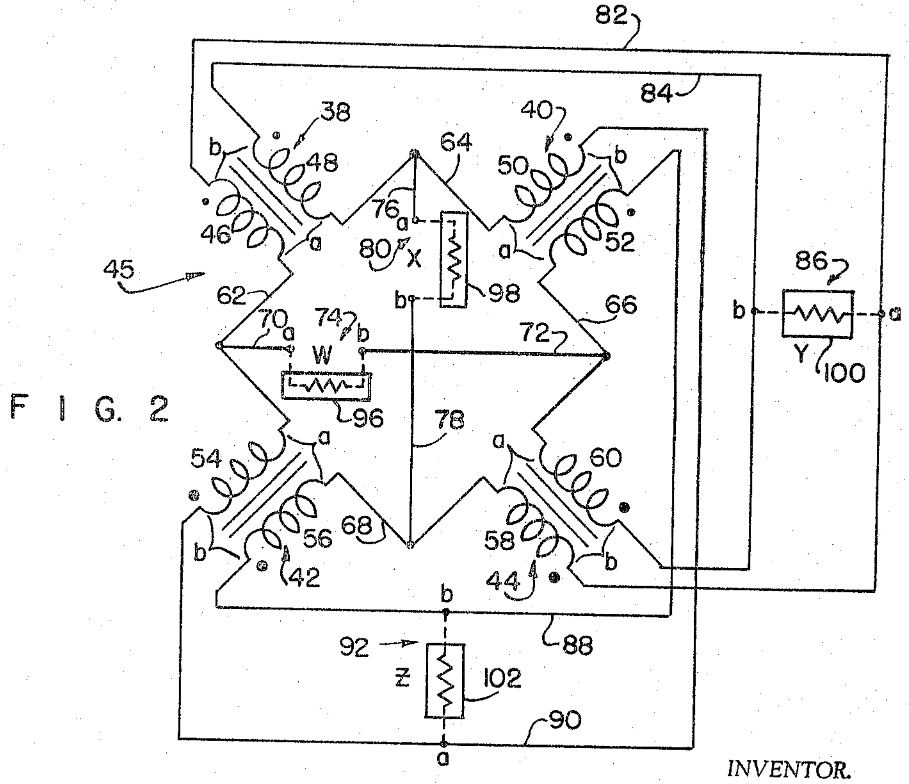
FIG. 2 is a schematic representation of a hybrid circuit embodying the invention.

FIG. 2 shows four preferably identical transmission line transformers 38, 40, 42 and 44 interconnected to form a hybrid circuit 45 embodying the invention. The transformers 38–44 comprise pairs of windings 46–48, 50–52, 54–56, and 58–60, respectively. For convenience, the transformers are denominated as having input terminals identified with the letter (*a*) following the corresponding winding number, and output terminals similarly identified with the letter (*b*). Thus, the transformer 38 has input terminals **46*a* and 48*a*, and output terminals 46*b* and 48*b*. The transformers constituting the hybrid circuit 45 preferably have the same construction as the transformer 10** of FIG. 1.

The transformers of FIG. 2 are interconnected with their input terminals arranged in a bridge circuit, that is, with the following input terminals together: **46*a* and 54*a*, 48*a* and 50*a*, 52*a* and 60*a*, 58*a* and 56*a*. Equal length conductors 62, 64, 66 and 68** are preferably used for these interconnections to ensure that the hybrid circuit is symmetrical, as described below.

Also in FIG. 2, equal length conductors 70 and 72 are connected between the midpoints of the conductors 62 and 66 to form a first port 74 of the hydrid circuit. Similarly, conductors 76 and 78, of the same length as conductors 70 and 72, are connected to the midpoints of the conductors 64 and 68 respectively to form a second port 80.

For ease in identification, the ports 74 and 80 will hereinafter sometimes be referred to as the W and X ports, respectively, with terminals W*a* and W*b*, and X*a* and X*b*.

For connecting external circuits *in parallel* with the remaining ports of the hybrid circuit 45, the output terminals of diagonally opposite transmission line transformers are connected together. Thus a conductor 82 interconnects the transformer output terminals 46*b* and 58*b* and a conductor 84 interconnects the terminals 48*b* and 60*b*. The midpoints of these conductors 82 and 84 form a third hybrid circuit port 86, sometimes hereinafter referred to as the Y port. The hybrid circuit is completed with a pair of conductors 88 and 90 connected between the transformer terminals 52*b* and 56*b*, and 50*b* and 54*b*. A fourth hybrid circuit port 92, sometimes hereinafter referred to as the Z port, is formed between the midpoints of these interconnecting conductors. The conductors 82, 84, 88 and 90 are preferably of the same length.

Figure 3:
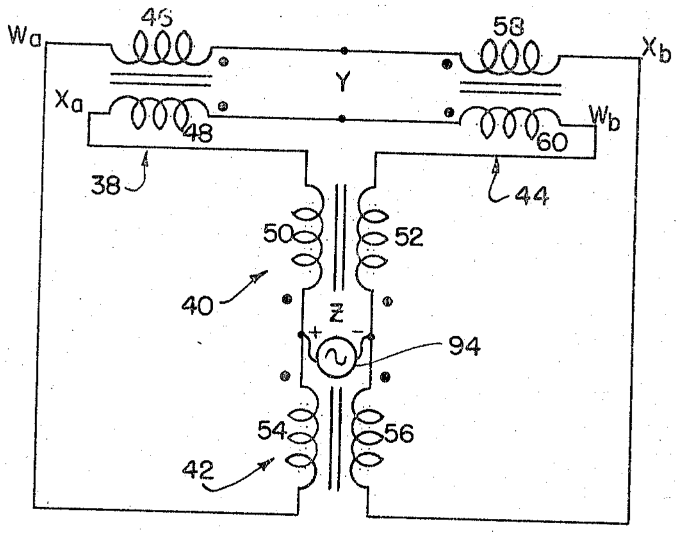
FIG. 3 is a schematic representation showing the hybrid circuit of FIG. 2, rearranged to emphasize its symmetry.

In FIG. 3, the hybrid circuit 45 of FIG. 2 is rearranged to emphasize one aspect of its symmetry. The operation of the circuit in isolating the Y and Z ports from each other, while coupling each of these ports equally to the W and X ports, will now be described. Assume that a source 94 of alternating voltage is connected across the Z port and has the instantaneous polarity indicated.

The windings 50 and 52 of transformer 40 are in series with the source 94, as are the windings 54 and 56 of transformer 42. Accordingly, the source 94 applies equal and opposite currents to the paired windings 50 and 52 and to the paired windings 54 and 56. Since the mutual and self inductances of the windings in each transformer differ only by the relatively small leakage inductance, the opposite currents in windings 50 and 52 produce fluxes that largely cancel each other. The leakage flux in the transformer 40 is balanced by the interwinding capacity to provide a resistive characteristic impedance, and no other flux is present in the transformer 40. Hence the source 94 develops no voltage across the windings 50 and 52. In other words, the windings 50 and 52 present substantially zero reactance to the current from the source 94 at the Z port. Similarly, the oppositely-directed currents in the windings 54 and 56 produce no net voltage drop across the transformer 42.

Whereas with matched loads at the W and X ports, the source 94 at the Z port applies oppositely-directed currents to the coupled windings 50–52 and 54–56, any currents in the coupled windings 46–48 and 58–60 of the transformers 38 and 44 have the same direction. Accordingly, the self-induced and mutual fluxes in each winding reinforce each other, causing the winding to have a high series reactance.

As a result, the total source voltage appears across the terminals W*a* and X*b* and across the terminals X*a* and W*b*.

Figure 4:
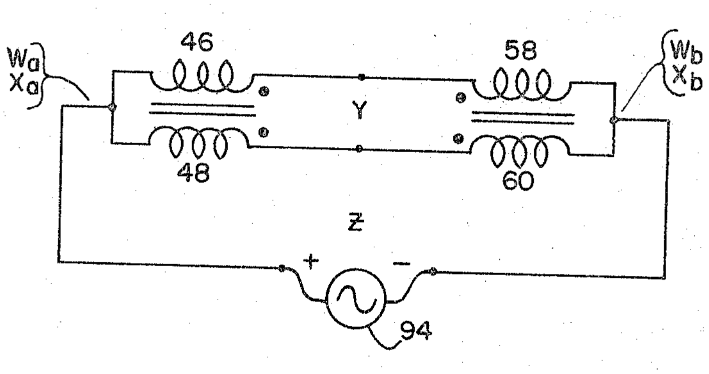
FIG. 4 is a simplified equivalent schematic representation of the hybrid circuit of FIG. 2 for one mode of operation.

The foregoing analysis permits the hybrid circuit 45 to be redrawn as in FIG. 4, with omission of the transmission line transformers 40 and 42, across the windings of which the source 94 develops no net voltage. The terminals forming the Y port are readily seen to be symmetrically connected with respect to the terminals of thet Z port, between which the source 94 is connected, and thus the source develops no voltage across the Y port. Hence, the hybrid circuit 45 isolates the Y port from the Z port.

The hybrid circuit 45 is reciprocal and hence, a source at the Y port develops no voltage at the Z port but is coupled equally to the W and X ports. More specifically, with reference to FIG. 3, it will be apparent from the symmetry of the circuit that if a voltage is applied to the Y port, there will be no voltage across the Z port.

As a result, when the resistance of an external circuit 96 (FIG. 2), connected between the terminals of the W port, is equal to the resistance of an external circuit 98 connected between the terminals of the X port, the hybrid circuit 45 isolates an external circuit 100 connected between the terminals of the Y port from another external circuit 102 connected between the terminals of the Z port. Moreover, since the external circuits 96 and 98 connected at the W and X ports are effectively connected in parallel across the source 94 at the Z terminals, FIG. 4, and each receives ½ the source current and the full source voltage, the hybrid circuit transfers maximum power to each external circuit 96 and 98 when the resistance of the external circuit is twice the internal resistance of the source. Identical results are produced when the source is connected at the Y port in the circuit of FIG. 2. These resistance transformations assume that the hybrid circuit impedance at each port is principally resistive.

Figure 5:
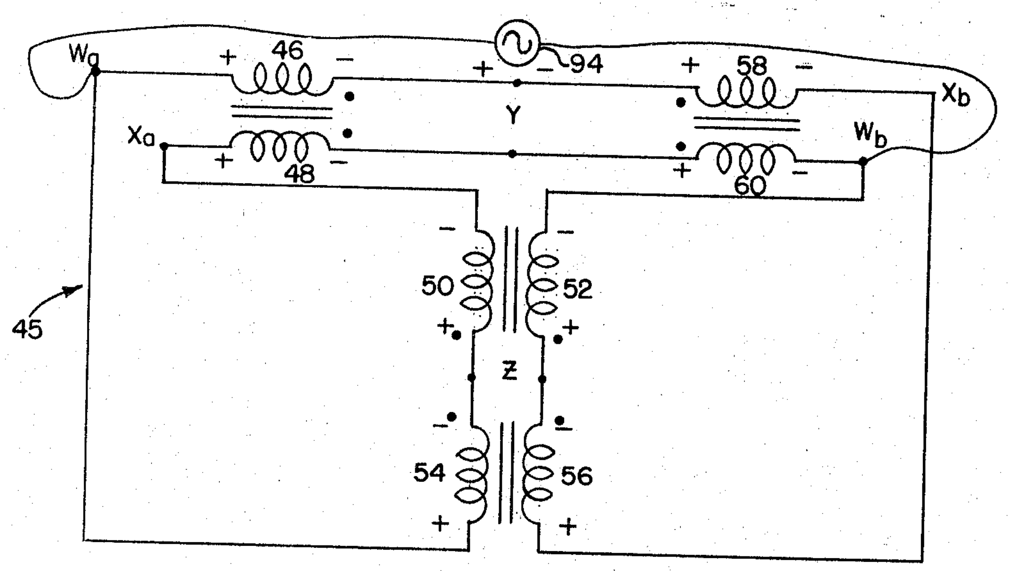
FIG. 5 is a schematic representation of the hybrid circuit of FIG. 2 with the same arrangement as shown in FIG. 3 and illustrating a second mode of the circuit's operation.

FIG. 5 shows the hybrid circuit 45 of FIG. 2 in the same manner as FIG. 3, except that the source 94 is now connected at the W port and has the instantaneous polarity indicated. The source current I divides equally between the two branches connected to each terminal W*a* and W*b* so that each transformer winding 46–60 has an applied current ½I. The applied currents in the two windings of each transformer have the same direction so that the self-induced and mutual fluxes linking each winding reinforce each other, causing each winding to present a high reactance to its current. The net total voltages across the windings are equal, having the indicated polarities.

Figure 6:
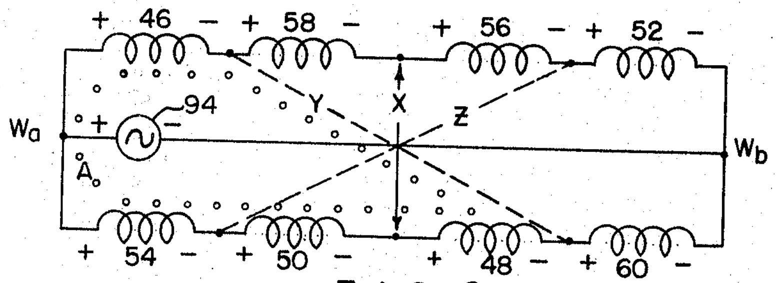
FIG. 6 is a simplified equivalent representation of the hybrid circuit of FIG. 5 for the second mode of operation.

Having thus taken into account the mutual coupling between the windings of each transformer, the windings can figuratively be separated and the hybrid circuit rearranged as shown in FIG. 6. The terminals of the X port are symmetrically connected in the middle of the branches. With this symmetrical arrangement of the terminals of the X port with respect to the source 94 at the W port, the source develops no voltage between them. Accordingly, the X port is isolated from the W port.

One half the source voltage appears across the Z port and one half across the Y port. This can be shown for the Y port, for example, by summing the voltages around the loop A (dotted line in FIG. 6) formed by the windings 46, 48, 50 and 54 and across the Y port. Thus $$V_{46}+V_Y-V_{48}-V_{50}-V_{54}=0 \qquad (1)$$

where the voltage across each winding is represented by the symbol V and a subscript numeral that corresponds to the reference number of a winding, and $V_Y$ is the voltage across the Y port.

Rearranging Equation 1, $$V_Y=V_{48}+V_{50}+V_{54}-V_{46} \qquad (2)$$

However, since the voltage across each winding is the same and is equal to ¼ the source voltage $V_o$ (there being four identical windings in series between the terminals W*a* and W*b* so that the source voltage divides equally among them), Equation 2 indicates that $V_Y$ is equal to ½ the source voltage $V_o$. Similarly, when the source is connected at the X port, it develops no voltage at the W port and develops equal voltages at the paired Y and Z ports.

A hybrid circuit constructed according to the foregoing description with transmission line transformers having a characteristic impedance of 75 ohms provided the following operation over a frequency range in excess of 2 to 32 megacycles with 75-ohm circuits connected across the W and X ports and 37½ ohm circuits at the Y and Z ports, as in FIG. 2. The impedance "looking into" the W and X ports remained within 1% of 75 ohms, and at the Y and Z ports within 1% of 37½ ohms, and the isolation between paired ports, i.e., between the W and X ports and between the Y and Z ports, exceeded 40 db. The loss through the hybrid circuit from one port to the ports of the other pair, e.g., from the Z port to the W and X ports, was too small to be measured being less than 0.1 db.

Figure 7:
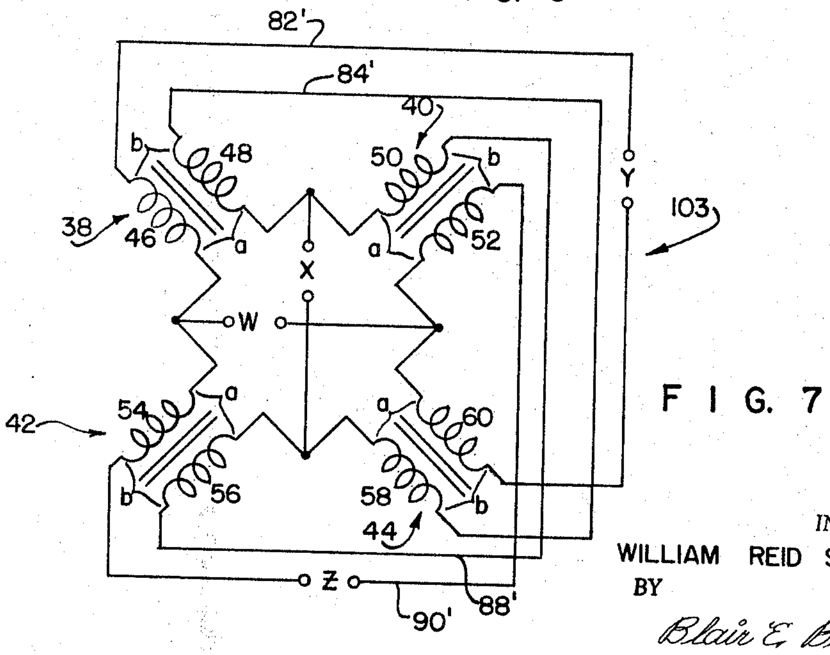
FIG. 7 is a schematic representation of the hybrid circuit of FIG. 2 arranged for series connection of external circuits thereto.

FIG. 7 shows a hybrid circuit 103 that is identical to the hybrid circuit 45 of FIG. 2 except that the transformers are interconnected so that external circuits at the Y and the Z ports are connected *in series* with a pair of transformers.

More specifically, in the hybrid circuit 103 the transmission line transformers 38, 40, 42 and 44 have their (*a*) terminals interconnected as in FIG. 2. However, the (*b*) terminals of transformers 38 and 44 and of transformers 40 and 42 are interconnected so that the Y and Z ports, respectively, are in series between a pair of transformers. Accordingly, in the hybrid circuit 103 the conductor 84' interconnects transformer terminals **48*b* and 58*b*, and the terminals of the Y port are in series in the conductor 82' which interconnects terminals 46*b* and 60*b*. Similarly, conductor 88' is connected between terminals 50*b* and 56*b* of the diagonally opposite transformers 40 and 42 and the terminals of the Z port are in series in the conductor 90'** connected between the other (*b*) terminals of these transformers. To provide symmetry in the hybrid circuit 103, the Y and Z ports are at the midpoints of the conductors 82' and 90', respectively.

The hybrid circuit 103 isolates the paired ports W and X, and Y and Z from each other and couples the paired ports equally to each port of the other pair, as demonstrated above for the shunt arranged circuit 75. However, whereas the parallel-arranged hybrid circuit 45 (FIG. 2) provides a 2:1 step down in impedance from the W and X ports to the Y and Z ports the series-arranged hybrid circuit of FIG. 7 provides a 1:2 impedance step up. For example, when constructed with transformers having a characteristic impedance of 75 ohms, the hybrid circuit 103 matches 75 ohm external circuits at the W and X ports with 150 ohm circuits at the Y and Z ports.

Figure 8:
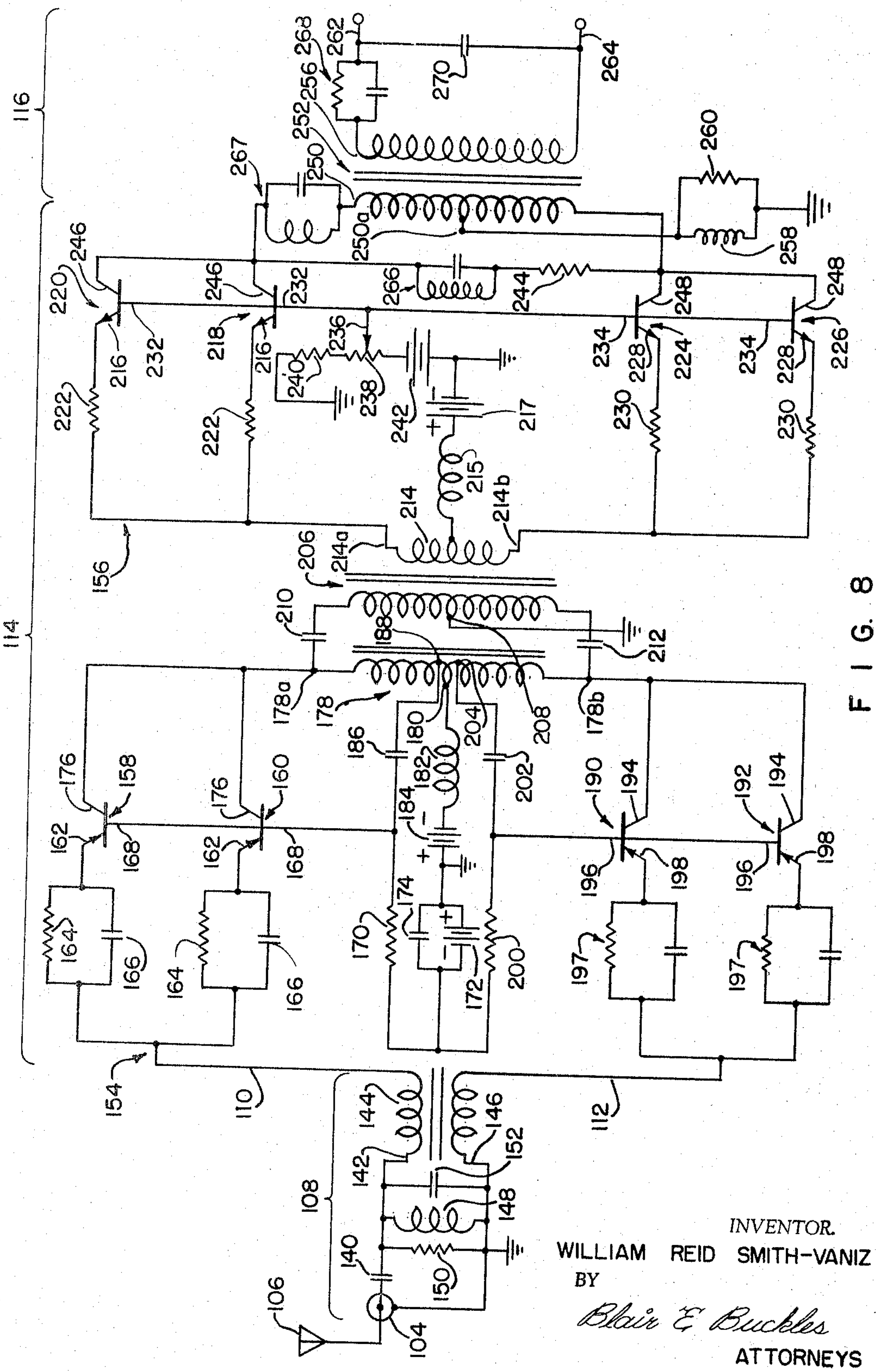
FIGS. 8 and 9 are a schematic representation of an amplifying multi-coupler embodying the invention.
Figure 9:
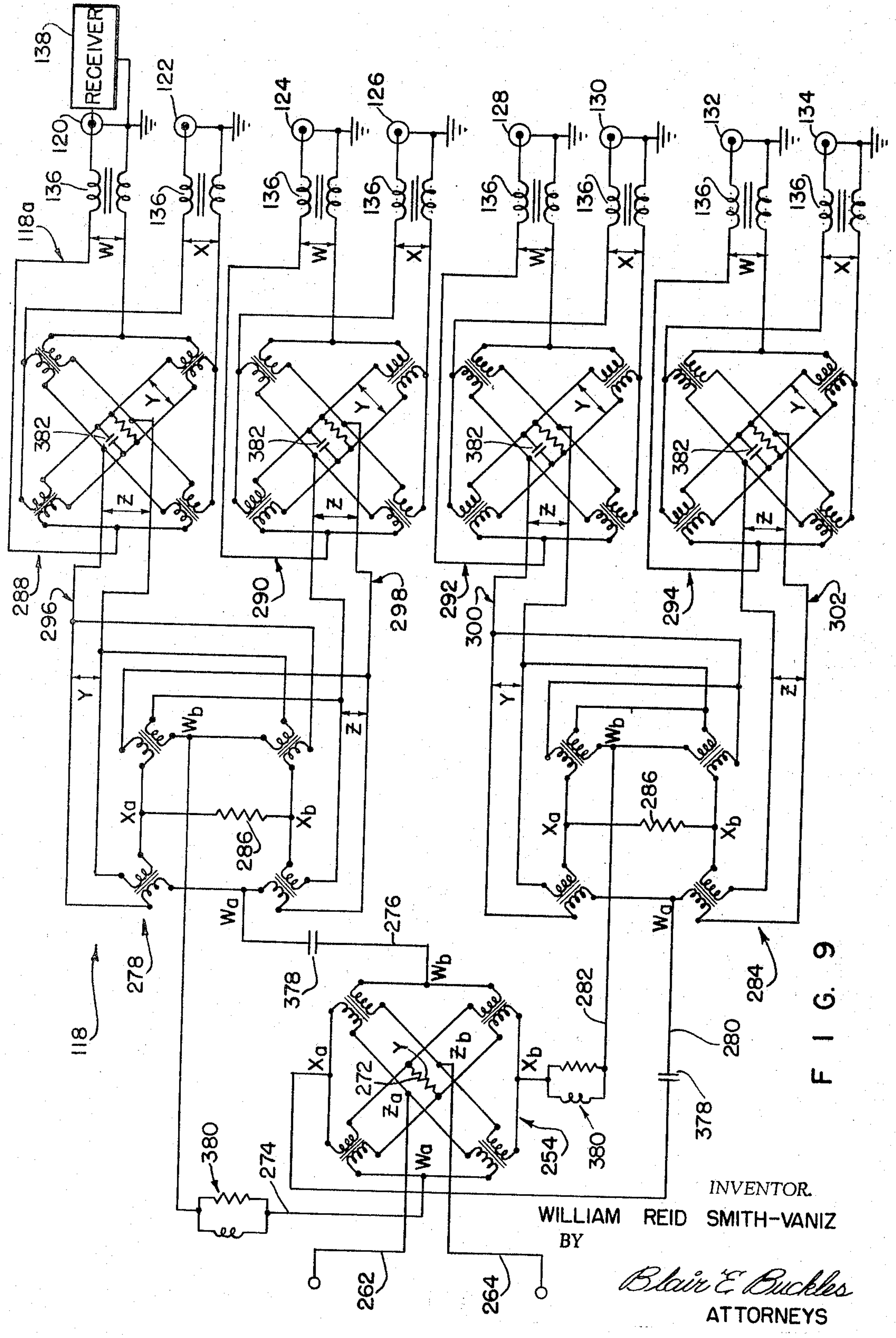

A multi-coupler, shown in two parts in FIGS. 8 and 9, has an input port 104 to which an unbalanced radio frequency signal, such as that produced by an antenna 106, is applied. The signal is applied to an input stage indicated at 108 that, among other functions, transforms the unbalanced input signal to a balanced signal on conductors 110 and 112. An amplifier indicated generally at 114 receives the signals on conductors 110 and 112 and, after amplification, delivers balanced signals to an output stage indicated generally at 116. The stage 116, in turn, is connected to a three-stage network 118 of hybrid circuits. Balanced to unbalanced transformers 136 are connected in series between the output ports of the hybrid circuits in the last stage **118*a* of the network 118 and the multi-coupler output ports 120–134 to enable unbalanced circuits, indicated as conventional receivers 138**, to process the signals from the multi-coupler.

Considering the multi-coupler in greater detail with particular reference to FIG. 8, the input port 104 is appropriately a coaxial transmission line section whose inner conductor is connected through a series-blocking capacitor 140 to an input terminal 142 of a transmission line transformer 144. The other conductor of the coaxial section is connected to the other input terminal 146 of the transformer 144. For broadband operation, thte transformer 144 may be constructed in the same manner as the transformer of FIG. 1 so as to transform the unbalanced signal at the input port 104 to a balanced signal on the conductors 110 and 112.

Preferably, the input circuit 108 also includes an inductor 148 connected between the transformer input terminals 142 and 146 and providing a return path for the emitter current in the amplifier 114, described hereinafter. A resistor 150 and a capacitor 152 may also be connected between terminals 142 and 146.

The amplifier 114 is constructed in two stages indicated generally at 154 and 156, each operating as a push-pull circuit providing uniform amplification for signals on the conductor pair 110–112. In the first amplifier stage 154, parallel-connected common base transistors 158 and 160 have their emitter terminals 162 connected to the conductor 110. The parallel combination of a resistor 164 and a capacitor 166 is in series with each emitter terminal 162 to limit the direct current through the transistor with which it is connected without impeding the radio frequency signals on the conductor 110.

The base terminals 168 of the transistors 158 and 160 are connected in parallel and thence through a series resistor 170 to the negative terminal of D.C. supply, shown as a battery 172, whose positive terminal is connected to ground. A bypass capacitor 174 is in parallel with the battery 172 and conducts radio frequency signals directly to ground.

The collector terminals 176 of the transistors 158 and 160 are also in parallel and connected to the end **178*a* of an autotransformer 178 that has a center tap 180. An isolating choke 182 connects the negative terminal of a direct current power supply, shown as a battery 184 having its positive terminal grounded, to the transformer center tap 180**.

A capacitor 186 connects the parallel-connected base terminals 168 to a tap 188 on the autotransformer 178. The tap 188 is intermediate tap 180 and the transformer end **178*a* and, in the illustrated embodiment, approximately ⅛ of the transformer turns between the center tap 180 and end 178*a* are between the center tap 180 and the intermediate tap 188**.

Connected with the input conductor 112 is a circuit identical with the one connected to the conductor 110. Thus, two transistors 190 and 192, having their collector terminals 194 and their base terminals 196 in parallel, have parallel resistor-capacitor circuits 197 connected in series between their emitter terminals 198 and the conductor 112. The base terminals 196 are connected to ground through a fixed resistor 200 and then through the parallel combination of the battery 172 and capacitor 174.

The collector terminals 194 of the transistors 190 and 192 are connected to the end **178*b* of the autotransformer 178, and a capacitor 202 connects the base terminals 196 to an intermediate tap 204 on the autotransformer 178. The intermediate taps 204 and 188 are symmetrically arranged with respect to the transformer center tap 180**.

Each transistor 158, 160, 190 and 192, arranged in a common base circuit, has a low resistance between its emitter and base terminals and a large impedance between its collector and base terminals. Accordingly, the base and emitter terminals of each transistor are at substantially the same A.-C. potential and the input voltage of the amplifier stage 154 appears principally between the intermediate transformer taps 188 and 204.

Accordingly, the stage develops an output voltage eight times larger than the input voltage (the autotransformer turns ratio being 8:1) between the end taps **178*a* and 178*b*. In addition, the transistors transfer the input current from their emitter terminals to their collector terminals. Thus, the stage 154 transforms the low impedance between the conductors 110 and 112 and an 8-fold larger impedance across the autotransformer 178 and similarly amplifies the voltage and power of the input signal on the conductors 110 and 112** by a factor of 8.

The impedance match provided by the first stage 154 could be provided with a resistor circuit instead of the input stage 154, but this would introduce resistor noise at the low signal level associated with the input of the multi-coupler and hence result in poor signal-to-noise ratio. On the other hand, the first amplifier stage described above presents a wideband matched impedance to the input stage and increases the multi-coupler's input signal level while introducing substantially no noise, thereby markedly increasing the signal-to-noise ratio.

The stage 154 is reciprocal in that a change in its load impedance, due to changes in the remainder of the multi-coupler circuit to the right of the first stage 154 (FIG. 8) is reflected back to the input stage 108 and hence to the input port 104. The second amplifier stage 156 avoids this problem by isolating the output of the first stage from the remainder of the multi-coupler circuit. The stage 156 also amplifies the input signal before it is divided among the multi-coupler's plural output ports.

The second stage 156 provides the desired impedance isolation and signal gain with a push-pull common base transistor amplifier in which each side again preferably has a plurality of identical, parallel-connected, transistors, of which two are shown in FIG. 8. A two-winding step-down interstage transformer 206, having a grounded primary winding center tap 208, transforms the high output impedance of the stage 154 to the low input impedance characteristic of grounded base transistors. Coupling capacitors 210 and 212 are in series between the auto-transformer ends 178*a* and 178*b* respectively and the ends of the primary winding of transformer 206.

The end 214*a* of the secondary winding 214 of transformer 206 is connected to the emitter terminals 216 of transistors 218 and 220 through resistors 222 and 224 respectively that increase the effective input impedance of the stage 156.

Similarly, as also shown in FIG. 8, two common base transistors 224 and 226 have their emitter terminals 228 connected through series resistors 230 to the other end 214*b* of the transformer secondary winding 214. The base terminals 232 of the transistors 218 and 220 and the base terminals 234 of the transistors 224 and 226 are connected together to the tap 236 of a potentiometer 238 connected between a grounded fixed resistor 240 and a direct current bias source, indicated as a battery 242 whose positive terminal is grounded.

As also shown in FIG. 8, a resistor 244 is connected between the collector terminals 246 of the transistors 220 and 218 and the collector terminals 248 of the transistors 224 and 226. The primary winding 250 of a stepdown transformer 252 is also connected between the collector terminals 246 and 248. The transformer 252 and the resistor 244 operate to step down the high output impedance of the common base transistors forming the stage 156 to the relatively low input impedance of the network 116, which is connected across the secondary winding 256 of the transformer 252 by means of conductors 262 and 264. In addition, a center tap 250*a* of the primary winding 250 is connected to ground through the parallel combination of an inductor 258 and a resistor 260 to present a substantial impedance to the radio frequency signals output from the amplifier 114.

The output of the second amplifier stage 156 includes several elements that improve the coupling between the amplifier 114 and the hybrid network 116, particularly for operation over an extended frequency range. More specifically, a parallel L-C circuit 266, comprising an inductor in parallel with a capacitor, is connected in series with the resistor 244 that forms part of the load impedance for the second amplifier stage 156. A similar circuit 267 is connected between the primary winding 250 of the transformer 252 and the collector terminals 246 of the transistors 218 and 220.

In addition, a parallel RC circuit 268 is connected in series with the conductor 262 and a capacitor 270 is connected between the conductors 262 and 264. The values of the parameters in the circuits 266, 267 and 268 and of the capacitor 270 are determined according to conventional techniques to compensate for frequency varying characteristics of the transformer 252, and of the transistors and their interconnections in the amplifier stage 156.

With reference to FIG. 9, the first stage of the network 118 is constructed with a hybrid circuit 254 identical to the hybrid circuit 45 shown in FIG. 2 and discussed above. The components of the hybrid circuit have been rearranged to simplify it when the Y and Z ports are used as input ports and the W and X ports are used as output ports. For ease in analysis, the W, X, Y and Z ports of each hybrid circuit in the network 118 correspond to the like-designated ports in FIG. 2.

In the illustrated embodiment of the multi-coupler, the windings of the hybrid circuits are constructed with two conductor transmission lines having a characteristic impedance of 75 ohms. Accordingly, the hybrid circuits match 75 ohm impedances across the W and X terminals to 37½ ohm impedances across the Y and Z terminals. Thus, conductors 262 and 264, connecting the output signal from the amplifier 114 to the Z port of the hybrid circuit 254, preferably form a 37½ ohm transmission line.

A 37½ ohm resistor 272 is connected between the terminals of the Y port of the hybrid circuit 254 to provide a matched termination. A pair of conductors 274 and 276 connect the terminals of the W port of the hybrid circuit 254 to the W port of a second stage hybrid circuit 278 in the network 118. The conductors 274 and 276 preferably form a 75 ohm transmission line, providing an impedance match at the W ports of the hybrid circuits 254 and 278. A similar pair of conductors 280 and 282 are connected between the X port of the hybrid circuit 254 and the W port of a hybrid circuit 284, also in the second stage of the network 118. Resistors 286, having a value of 75 ohms, are connected between the terminals of the X ports in the second stage hybrid circuits 278 and 284.

The hybrid circuit 254 thus divides the signal from the amplifier 114 into two balanced signals, delivering them to the hybrid circuits 278 and 284. The latter circuits further divide the signals by two, energizing four hybrid circuits 288, 290, 292 and 294 that constitute the last stage 118*a* of the network 118.

Each hybrid circuit of the network 118 transfers its input signal from one port to the two ports of the other pair thereof. Ideally, the port paired with the signal-receiving port receives no signal. Hence the loss through each hybrid circuit is extremely low.

The hybrid circuits 288–294 in the last stage of the network 118 are preferably connected to respective Y and Z ports of the hybrid circuits 278 and 284 by transmission lines 296, 298, 300 and 302, each of which has a characteristic impedance of 37½ ohms in the illustrated embodiment of the invention.

To preserve the symmetry of the hybrid networks, and thereby enhance the coupling and isolation thereof, the conductors 274 and 276, and the conductors 280 and 282, interconnecting the first two stages of the network 118, are preferably electrically identical; similarly the transmission lines 296–302 are electrically identical to each other.

The balance-to-unbalanced transmission line transformers 136, interconnecting the W and X ports of the hybrid circuits 288–294 with the multi-coupler output ports 120–134 preferably form 75 ohm transmission line paths between the interconnected ports. Again, the connections between the W and X ports of the hybrid circuits 288–294 and the multicoupler output ports are preferably electrically identical.

Although it is desirable that the hybrid network 118 be constructed with corresponding conductors having exactly equal lengths and symmetrical in all other respects, it has been found that asymmetries resulting from standard manufacturing tolerances do not render the circuit inoperative. On the contrary, high isolation between the multi-coupler output ports and uniform low-loss coupling between the Z (input) port of the hybrid circuit 254 and each of the output ports are readily obtained over an extremely broad frequency range. This effect can be enhanced with additional tuning reactances connected in the hybrid circuits to diminish frequency variations of their input impedances over the operating frequency range.

For example, the impedance presented to the W port of the hybrid circuit 254 by the hybrid circuit 278 to which it is connected is enhanced by the addition of a series capacitor 378 in the conductor 276 and a parallel resistor-inductor circuit 380 in series in the conductor 274. Some improvement in operation might be realized by connecting these compensation impedances in each conductor 274 and 276 in equal amount. However, the unequal distribution of the compensating impedances of the elements 378 and 380, as shown, results in satisfactory operation. Similar compensation is shown in the conductors 280 and 282, connecting the hybrid circuit 254 with the hybrid circuit 284.

It has also been found that the impedance presented to the Y and Z ports of the hybrid circuits 278 and 284 is made more uniform, for broadband operation, by the addition of a capacitor 382 between the terminals of the Y port in each of the third stage hybrid circuits 288–294.

A multi-coupler constructed according to the foregoing description provides a 2 db gain in each signal path between the input port 104 and output ports 120–134 over a frequency range of 2–32 megacycles. The voltage standing wave ratio at the input port 104 is less than 2:1 over this frequency range and the isolation between the several output ports 120–134 is greater than 40 db. The entire multi-coupler, although an active circuit providing substantial gain, lends itself very well to compact rugged construction and develops negligible heat even during prolonged operation.

In summary, the novel and improved hybrid circuit described above has relatively uniform operation over a wide range of radio frequencies. The hybrid circuit can be constructed at relatively low cost with transmission line transformers to occupy a small space. For example, the transformer of FIG. 1 occupies a generally cubic space less than ½ inch on each side. The frequency-stable characteristics of the hybrid circuits are efficiently utilized in the multi-coupler circuit of the invention, which also incorporates a novel broadband, balanced amplifier.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Having described the invention, what I claim as new and secure by Letters Patent is:

1. A radio frequency hybrid coupling circuit comprising in combination first and second pairs of substantially identical transmission line transformers, (A) each of said transformers comprising a pair of substantially identical parallel windings, each winding having first and second ends respectively, whereby currents flowing in the same direction through each winding produce additive magnetic flux in the same direction, (1) and equal currents flowing in opposite directions through said windings produce opposite magnetic fluxes which cancel each other, (B) a pair of conductors of substantially equal length connecting corresponding first ends of each winding of one transformer with the corresponding first ends of its paired transformer, (C) a further pair of conductors of substantially equal length connecting the second ends of one transformer of said first pair of transformers with the second ends of each transformer of said second pair, and (D) another pair of conductors of substantially equal length connecting the second ends of the other transformer of said first pair of transformers with the remaining second ends of each transformer of said second pair.

2. The hybrid circuit defined in claim 1 wherein:

(B) each pair of conductors connecting the corresponding first ends of each pair of transformers is also connected to a pair of terminals, each said pair of terminals forming a port of said hybrid circuit, and (C) each conductor of said further pairs of conductors is also connected to a different terminal of a further pair of terminals, each of which further pairs of terminals forms a separate port of said hybrid circuit, (1) whereby said hybrid is provided with as many ports as there are line transformers, and (2) resistive impedances connected at any port are reflected as corresponding resistive impedances at its opposite paired port.

3. A radio frequency hybrid coupling circuit comprising in combination (A) first, second, third and fourth substantially identical transmission line transformers, (1) each said transformer having a pair of substantially identical parallel windings with first and second ends, (B) first, second, third and fourth pairs of conductors each having first and second ends connected respectively to said first, second, third and fourth transformers, (1) each conductor of a pair being connected in series with separate windings of each of said transformers, (2) each conductor being connected at a first end thereof to a corresponding conductor at one end of an adjacent transformer winding, and (3) each of said pairs of conductors being connected at their second ends to the corresponding winding ends of an opposite transformer, (a) whereby said transformer inter-connections form a hybrid comprising two parallel circuits, each said circuit including in series arrangement one coil from each of said transformers, (C) a first pair of hybrid port terminals connected respectively betwen opposite junctions of said first conductor ends, and (D) a second pair of hybrid port terminals connected respectively between corresponding junctions of said second conductor ends, (1) whereby resistive impedances connected across a port of either pair of port terminals appear as corresponding resistive impedances across the opposite port of the other pair of port terminals, and (2) the remaining ports are completely isolated from any port so connected.

4. The hybrid circuit defined in claim 3 wherein (A) each transmission line transformer includes magnetic core means coupling the parallel windings thereof, and (B) said pairs of conductors are substantially electrically identical.

5. A four-port hybrid circuit comprising in combination
(A) first, second, third and fourth identical transmission line transformers,
(1) each transformer comprising first and second closely coupled windings having a common magnetic core structure and with each winding having first and second ends,
(2) said windings of each transformer being so wound in parallel that currents directed into said windings at said first ends produce magnetic fluxes in the same direction,
(B) first, second, third and fourth electrically identical conductors respectively connected between said first ends of said second and first windings, respectively,
(1) of said first and second transformers,
(2) of said second and third transformers,
(3) of said third and fourth transformers, and
(4) of said fourth and first transformers,
(C) fifth, sixth, seventh and eighth electrically identical conductors,
(1) each of said fifth and sixth conductors being connected between said second ends of a winding of said first transformer and a different-numbered winding of said third transformer,
(2) each of said seventh and eighth conductors being connected between said second ends of a winding of said second transformer and a different-numbered winding of said fourth transformers,
(D) a first hybrid circuit port connected between the mid-points of said second and fourth conductors,
(E) a second hybrid circuit port connected between the mid-points of said first and third conductors,
(F) a third hybrid circuit port connected between the mid-points of said fifth and sixth conductors, and
(G) a fourth hybrid circuit port connected between the mid-points of said seventh and eighth conductors.

6. A four-port hybrid circuit comprising in combination
(A) first, second, third and fourth identical transmission line transformers,
(1) each transformer comprising first and second closely coupled windings having a common magnetic core structure and with each winding having first and second ends,
(2) said windings of each transformer being parallel to each other so that currents directed into said windings at said first ends produce magnetic fluxes in the same direction,
(B) first, second, third and fourth electrically identical conductors respectively connected between said first ends of said second and first windings, respectively,
(1) of said first and second transformers,
(2) of said second and third transformers,
(3) of said third and fourth transformers, and
(4) of said fourth and first transformers,
(C) a first hybrid circuit port connected between the mid-points of said second and fourth conductors,
(D) a second hybrid circuit port connected between the mid-points of said first and third conductors,
(E) fifth and sixth conductors,
(F) a third hybrid circuit port connected in series in one of said fifth and sixth conductors at the midpoint thereof,
(1) each of said fifth and sixth conductors being connected between said second ends of a winding of said first transformer and a same-numbered winding of said third transformer,
(G) seventh and eighth conductors,
(H) a fourth hybrid circuit port in series in one of said seventh and eighth conductors at the midpoint thereof,
(1) each of said seventh and eighth conductors being connected between said second ends of a winding of said second transformer and a same-numbered winding of said fourth transformer.

7. A multiple-stage balanced electronic amplifier for broadband radio frequency operation, said amplifier comprising in combination
(A) first and second input stage amplifying devices
(1) each said device having first, second and third terminals,
(2) operable to develop between its second and third terminals an amplified representation of an input signal between its first and third terminals,
(B) a transformer winding having
(1) first and second taps and a center tap midway between said first and second taps, and
(2) opposite end terminals symmetrically arranged with respect to said center tap,
(C) a pair of first radio frequency coupling means connecting said second terminals of said first and second amplifying devices respectively with said first and second taps,
(D) means connecting said third terminals of said first and second amplifying devices with said transformer opposite end terminals respectively,
(E) third and fourth output stage amplifying devices each having fourth, fifth and sixth terminals, and being operable to develop between its fifth and sixth terminals an amplified representation of the signal between its fourth and sixth terminals,
(F) an interstage transformer having a primary winding and a secondary winding,
(1) said primary winding of said interstage transformer being connected in circuit between said opposite end terminals of said transformer winding to receive the signal output from said first and second amplifying devices,
(2) said secondary winding of said interstage transformer being connected between said fourth terminals of said third and fourth amplifying devices, and
(G) balanced output impedance transforming means having a pair of balanced output terminals,
(1) said transforming means being connected between said fifth terminals of said third and fourth amplifying devices, and
(2) presenting a first selected impedance to said third and fourth amplifying devices and transforming said first selected impedance to a second selected value between said output terminals,
(H) an unbalanced transmission line section for connection with a source of radio frequency signals,
(1) said section having a grounded conductor and an ungrounded conductor,
(I) an inductor connected between the conductors of said unbalanced line section to pass direct current from said ungrounded conductor to the grounded conductor, and
(J) an unbalanced-to-balanced transformer connected between said unbalanced transmission line section and said first terminals of said first and second amplifying devices.

8. A multiple-stage balanced electronic amplifier for broadband radio frequency operation, said amplifier comprising in combination
(A) first and second input stage amplifying devices
(1) each said device having first, second and third terminals,
(2) operable to develop between its second and third terminals an amplified representation of an input signal between its first and third terminals,
(B) a transformer winding having
(1) first and second taps and a center tap midway between said first and second taps, and (2) opposite end terminals symmetrically arranged with respect to said center tap, (C) a pair of first radio frequency coupling means connecting said second terminals of said first and second amplifying devices respectively with said first and second taps, (D) a pair of second radio frequency coupling means connecting said third terminals of said first and second amplifying devices with said transformer opposite end terminals respectively, (E) third and fourth output stage amplifying devices each having fourth, fifth and sixth terminals, and being operable to develop between its fifth and sixth terminals an amplified representation of the signal between its fourth and sixth terminals, (F) an interstage transformer having a primary winding and a secondary winding, (1) said primary winding of said interstage transformer being connected in circuit between said opposite end terminals of said transformer winding to receive the signal output from said first and second amplifying devices, (2) said secondary winding of said interstage transformer being connected between said fourth terminals of said third and fourth amplifying devices, and (G) balanced output impedance transforming means having a pair of balanced output terminals, (1) said transforming means being connected between said fifth terminals of said third and fourth amplifying devices, and (2) presenting a first selected impedance to said third and fourth amplifying devices and transforming said first selected impedance to a second selected value between said output terminals, (3) including an output transformer having a primary winding and a secondary winding, (a) said output transformer primary winding being in circuit between said fifth terminals of said third and fourth amplifying devices, (4) a resistor in circuit between the ends of said output transformer primary winding, and (5) a parallel-resonant circuit in series with said resistor between the ends of said output transformer primary winding.

9. A multiple stage broadband amplifier for amplifying balanced radio frequency signals and isolating its input terminals from its output terminals, said amplifier comprising in combination (A) first and second input conductors for receiving a balanced radio frequency signal, (B) at least first and second input stage transistors each having emitter, base and collector terminals, (1) the base terminals of each stage being connected through a resistance to a source of negative bias potential, (C) a pair of direct-current limiting circuits, having low radio frequency impedance, connected in series between said input conductors and said input transistor emitter terminals, (D) an autotransformer having a center tap midway between opposite end terminals, (1) first and second taps on said autotransformer symmetrically arranged with respect to said center tap, (2) said collector terminals of said first and second input transistors being respectively connected to the opposite end terminals of said autotransformer, (3) said center tap being connected through a radio frequency choke to a source of negative D.C. power, (E) a pair of capacitors connecting said base terminals of said input transistors to said first and second taps of said autotransformer, (F) at least third and fourth output stage transistors each having emitter, collector and base terminals, (1) the base terminals of said output stage transistors being connected together to a common source of negative bias potential, (G) an interstage transformer having a primary winding and a secondary winding, (1) said primary winding of said interstage transformer being connected between said opposite end terminals of said autotransformer, (2) said secondary winding of said interstage transformer being connected between said emitter terminals of said output transistors, (H) a pair of resistors in series between the ends of said intertage transformer secondary winding and said emitter terminals of said output transistors, (I) balanced output impedance transforming means comprising an output transformer having a primary winding and a secondary winding, (1) said output transformer primary winding being connected between said collector terminals of said output transistors, (J) a third resistor connected between said collector terminals of said output transistors, and (K) a parallel capacitor-inductor combination in series with said third resistor.

10. A radio frequency multicoupler comprising in combination (A) a pair of input conductors for receiving a balanced radio frequency signal, (B) a balanced input amplifier stage connected with said input conductors for receiving said radio frequency signals and having a pair of output terminals, said input amplifier stage, (1) having load impedance means connected between its output terminals, (2) presenting a matched impedance to said input conductors over a broad range of radio frequencies, and (3) developing at its output terminals an amplified representation of the radio frequency input signal, (C) a balanced output amplifier stage having a pair of input terminals and a pair of output terminals, (1) said output amplifier stage presenting a uniform input impedance between said input terminals thereof over a relatively wide radio frequency range and isolating its input impedance from the impedance between its output terminals, (2) said output stage developing at its output terminals an amplified representation of the radio frequency signal at its input terminals, (D) a balanced interstage impedance transforming stage connected between said output terminals of said input amplifier stage and said input terminals of said output amplifier stage and matching the output impedance of said input amplifier stage with said input impedance of said output amplifier stage, (E) a signal-dividing network having a pair of balanced input terminals, a plurality of output ports, and comprising at least two stages of cascaded hybrid circuits with one hybrid circuit in its first stage and two hybrid circuits in its second stage, (1) each said hybrid circuit comprising first, second, third and fourth substantially identical transmission line transformers, (a) each said transformer having first and second substantially identical parallel windings with first and second ends, so that currents flowing into said windings at the first ends thereof produce magnetic fluxes in the same direction, (2) first, second, third and fourth pairs of conductors connected respectively to the winding ends of first, second, third and fourth transformers,
(a) each conductor of a pair being connected in series with a separate winding of each of said transformers,
(b) one conductor of each pair being connected to corresponding ends of adjacent transformers,
(c) the other conductor of each pair being connected to corresponding ends of opposite transformers,
(i) whereby said interconnected conductors and transformer windings form each of said hybrid circuits,
(ii) each said hybrid provides four matched ports between each of said pairs of conductors, and
(iii) each said hybrid forms two parallel circuit paths between each of two paired ports, with each path including one winding from each of said transformers,
(3) means connecting a first port of the hybrid circuit in said first stage to the output terminals of said output amplifier stage,
(4) means connecting a first matching impedance to a second port of the hybrid circuit in said first stage,
(5) means connecting the third and fourth ports of said first hybrid circuit respectively with the third port of each of said second and third hybrid circuits in said second stage,
(6) means connecting separate matching impedances to the fourth ports of said second and third hybrid circuits respectively, and
(7) means connecting the first and second ports of said second and third hybrid circuits, respectively, to separate and independent output ports of said network.

11. A radio frequency multicoupler comprising in combination
(A) a pair of input conductors for receiving a balanced radio frequency signal,
(B) a balanced input amplifier stage connected with said input conductors for receiving said radio frequency signals and having a pair of output terminals, said input amplifier stage
(1) having load impedance means connected between its output terminals,
(2) presenting a matched resistive impedance to said input conductors over a broad range of radio frequencies, and
(3) developing at its output terminals an amplified representation of the radio frequency input signal,
(C) a balanced output amplifier stage having a pair of input terminals and a pair of output terminals,
(1) said output amplifier stage presenting a uniform flat input impedance between said input terminals thereof over a relatively wide radio frequency range and isolating its input impedance from the impedance between its output terminals,
(2) said output stage developing at its output terminals an amplified representation of the radio frequency signal at its input terminals,
(D) a balanced interstage impedance transforming stage connected between said output terminals of said input amplifier stage and said input terminals of said output amplifier stage and matching the output impedance of said input amplifier stage with said input impedance of said output amplifier stage,
(E) a signal-dividing network having a pair of balanced input terminals and a plurality of output ports,
(1) said input terminals of said network being connected with said output terminals of said output amplifier stage,
(2) said network isolating its output ports from each other and uniformly coupling its output ports to its input terminals,
(F) balanced-to-unbalanced transformers connected in series with said output ports of said signal dividing network to transform balanced signals applied thereto to unbalanced signals,
(G) an unbalanced input port, and
(H) an input stage comprising an unbalanced-to-balanced transformer connected between said unbalanced input port and said input conductors,
(1) whereby a resistive impedance at said input conductors is reflected as a corresponding resistive impedance at said output ports.

12. A hybrid circuit comprising in combination
(A) first, second, third and fourth baluns, each balun comprising first and second conductors respectively having first and second ends,
(B) a first pair of conductive means connected between said first ends of said second and first conductors respectively of said first and second baluns and of said third and fourth baluns,
(1) said first pair of conductive means forming a first hybrid circuit port,
(C) a pair of second conductive means connected between said first ends of said second and first windings respectively of said second and third baluns and of said fourth and first baluns,
(1) said second conductive means forming a second hybrid circuit port paired with said first port,
(D) a third pair of conductive means each of which is connected between said second ends of a winding of said first balun and a winding of said third balun,
(1) said third pair of conductive means forming a third hybrid circuit port, and
(E) a fourth pair of conductive means each of which is connected between said second ends of a winding of said second balun and a winding of said fourth balun,
(1) said fourth pair of conducting means forming a fourth hybrid circuit port paired with said third port.

13. The circuit defined in claim 12 in which
(A) each conductive means of said third and fourth pairs thereof is connected between same-numbered balun windings, and
(B) each of said third and fourth ports respectively is in series in a conductive means of said third and fourth pairs thereof.

14. The circuit defined in claim 12 in which
(A) each conductive means of said third and fourth pairs thereof is connected between different-numbered balun windings and
(B) said third and fourth ports are in shunt between said conductive means of said third and fourth pairs thereof respectively.

References Cited by the Examiner

UNITED STATES PATENTS

| | | | |
|---|---|---|---|
| 3,091,739 | 5/1963 | Smith-Vaniz | 330—30 |
| 3,143,715 | 8/1964 | Martens et al. | 333—11 XR |
| 3,192,490 | 6/1965 | Petts et al. | 333—11 |
| 3,239,781 | 3/1966 | Podell | 333—11 |

ROY LAKE, *Primary Examiner.*

F. D. PARIS, E. C. FOLSOM, *Assistant Examiners.*